US012562468B2

(12) United States Patent
Ahn et al.

(10) Patent No.: US 12,562,468 B2
(45) Date of Patent: Feb. 24, 2026

(54) CONDUCTIVE MESH STRUCTURE AND ANTENNA ELEMENT COMPRISING SAME

(71) Applicant: DONGWOO FINE-CHEM CO., LTD., Jeollabuk-do (KR)

(72) Inventors: Gi Hwan Ahn, Chungcheongnam-do (KR); Ho Dong Yoon, Gyeonggido (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 111 days.

(21) Appl. No.: 18/114,723

(22) Filed: Feb. 27, 2023

(65) Prior Publication Data

US 2023/0238692 A1 Jul. 27, 2023

Related U.S. Application Data

(63) Continuation of application No. PCT/KR2021/011181, filed on Aug. 23, 2021.

(30) Foreign Application Priority Data

Aug. 28, 2020 (KR) ........................ 10-2020-0109542

(51) Int. Cl.

*H01Q 1/38* (2006.01)
*H01B 5/14* (2006.01)
*H01Q 1/36* (2006.01)

(52) U.S. Cl.

CPC ................. *H01Q 1/38* (2013.01); *H01B 5/14* (2013.01); *H01Q 1/364* (2013.01)

(58) Field of Classification Search

CPC ............. H01Q 1/364; H01Q 1/38; H01B 5/14
See application file for complete search history.

(56) References Cited

U.S. PATENT DOCUMENTS

2009/0219257 A1 9/2009 Frey et al.
2014/0198264 A1 7/2014 Gao et al.
2015/0286323 A1 10/2015 Kazuchika et al.
2016/0190678 A1 6/2016 Hong et al.
(Continued)

FOREIGN PATENT DOCUMENTS

CN 101675485 A 3/2010
JP 2015-97358 A 5/2015
(Continued)

OTHER PUBLICATIONS

International Search Report for PCT/KR2021/011181 mailed on Dec. 3, 2021.
(Continued)

*Primary Examiner* — Amal Patel
(74) *Attorney, Agent, or Firm* — The PL Law Group, PLLC

(57) ABSTRACT

A conductive mesh structure according to an embodiment includes a dielectric layer, and a conductive mesh layer including first conductive lines and second conductive lines arranged on the dielectric layer and intersecting each other. The conductive mesh layer satisfies a predetermined range of transmittance and numerical values related to the interior angle of a mesh unit cell. An antenna element in which moiré is suppressed can be manufactured from the conductive mesh structure.

4 Claims, 3 Drawing Sheets

(56) References Cited

U.S. PATENT DOCUMENTS

| | | | | |
|---|---|---|---|---|
| 2016/0274702 | A1* | 9/2016 | Satou | G06F 3/0446 |
| 2020/0403301 | A1* | 12/2020 | Ryu | H01Q 1/46 |

FOREIGN PATENT DOCUMENTS

| | | | | |
|---|---|---|---|---|
| JP | 2015-108885 A | 6/2015 | | |
| JP | 2021-518071 A | 7/2021 | | |
| KR | 10-2013-0048574 A | 5/2013 | | |
| KR | 10-2016-0034020 A | 3/2016 | | |
| KR | 10-2016-0075722 A | 6/2016 | | |
| KR | 10-2019-0105812 A | 9/2019 | | |
| WO | WO 2017/115641 A1 | 7/2017 | | |
| WO | WO 2018/55786 A1 | 8/2018 | | |
| WO | 2018-180746 A1 | 10/2018 | | |
| WO | WO-2019172609 A1 * | 9/2019 | | H01Q 1/243 |

OTHER PUBLICATIONS

Office action issued on Feb. 12, 2025 from Japan Intellectual Property Office in a counterpart Japanese Patent Application No. 2023-512484 (all the cited references are listed in this IDS.) (English translation is also submitted herewith.).

Office action issued on Jun. 24, 2025 from China Patent Office in a counterpart China Patent Application No. 202180053474.0 (all the cited references are listed in this IDS.) (English translation is also submitted herewith.).

* cited by examiner

CONDUCTIVE MESH STRUCTURE AND ANTENNA ELEMENT COMPRISING SAME

CROSS-REFERENCE TO RELATED APPLICATION AND CLAIM OF PRIORITY

The present application is a continuation application to International Application No. PCT/KR2021/011181 with an International Filing Date of Aug. 23, 2021, which claims the benefit of Korean Patent Application No. 10-2020-0109542 filed on Aug. 28, 2020 at the Korean Intellectual Property Office, the disclosures of which are incorporated by reference herein in their entirety.

BACKGROUND

1. Technical Field

The present invention relates to a conductive mesh structure and an antenna element including the same. More particularly, the present invention relates to a conductive mesh structure including intersecting conductive lines and an antenna element including the same.

2. Background Art

Recently, an image display device are being combined with a communication device such as a smart phone. Accordingly, an antenna for implementing a high frequency or ultra-high frequency communication may be included in the image display device. Further, various sensor members such as a touch sensor and a fingerprint sensor are also coupled to the image display device, and various communication/sensing functions are added to and implemented with a display function.

The antenna or the sensor member includes a conductor such as a metal layer, and transmittance of an image display device may be reduced or an image quality may be deteriorated by the conductor.

Additionally, when a regular pattern structure in a mesh structure and a pixel array structure included in the image display device overlap each other, a moiré phenomenon may occur to interfere with an image from the image display device.

Accordingly, constructions of conductive lines included in the mesh structure are required in consideration of transmittance of the mesh structure and the moiré of the pixel arrangement structure of the image display device.

Further, the conductive lines of the antenna or sensor member using the mesh structure are to be designed so as to sufficiently provide desired radiation properties and sensing sensitivity.

SUMMARY

According to an aspect of the present invention, there is provided a conductive mesh structure having improved optical and electrical properties.

According to an aspect of the present invention, there is provided an antenna element having improved optical and electrical properties.

(1) A conductive mesh structure, including: a dielectric layer; and a conductive mesh layer disposed on the dielectric layer, the conductive mesh layer including first conductive lines and second conductive lines crossing each other, wherein the conductive mesh structure that satisfies Equation 1 below:

$$18.5\% \leq (\text{a transmittance of the conductive mesh structure}) \times \tan(\theta/2) \leq 60\% \quad \text{[Equation 1]}$$

(In Equation 1, θ is an intersecting angle of the first conductive lines and the second conductive lines).

(2) The conductive mesh structure according to the above (1), wherein the conductive mesh layer includes unit cells defined by the neighboring first conductive lines and the second conductive lines, and θ in Equation 1 is an interior angle of the unit cell.

(3) The conductive mesh structure according to the above (2), wherein the conductive mesh structure satisfies Equation 2 below:

$$18.5\% \leq (\text{a transmittance of the dielectric layer}) \times (\text{a ratio of an open area of the conductive mesh layer}) \times \tan(\theta/2) \leq 60\% \quad \text{[Equation 2]}$$

(4) The conductive mesh structure according to the above (3), wherein the ratio of the open area of the conductive mesh layer is defined by Equation 3 below:

$$(\text{the ratio of the open area of the conductive mesh layer}) = (XY)/\{(X+2W\times\mathrm{COS}(\theta/2))(Y+2W\times\mathrm{SIN}(\theta/2))\} \quad \text{[Equation 3]}$$

(In Equation 3, X is a length of a diagonal line in a horizontal direction, Y is a length of a diagonal line in a vertical direction, and W is a line width of the first conductive lines and the second conductive lines).

(5) The conductive mesh structure according to the above (1), wherein a value of (the transmittance of the conductive mesh structure)×tan (θ/2) included in Equation 1 is in a range from 20 to 55%.

(6) An antenna element including the conductive mesh structure according to the above-described embodiments.

(7) The antenna element according to the above (6), including a radiator formed from the conductive mesh layer.

(8) The antenna element according to the above (7), further including a transmission line formed from the conductive mesh layer and connected to the radiator.

(9) The antenna element according to the above (7), further including a dummy mesh pattern formed from the conductive mesh layer and physically and electrically separated from the radiator.

(10) The antenna element according to the above (6), wherein the antenna element has a gain of 0 dBi or more at a frequency of 20 GHz or more.

A conductive mesh structure according to embodiments of the present invention includes a substrate layer and a conductive mesh layer, and a transmittance of the substrate layer and a transmittance of the conductive mesh structure may be controlled to adjust a transmittance of the conductive mesh structure within a predetermined range. Additionally, the transmittance of the conductive mesh layer may be adjusted in consideration of an interior angle of a unit cell included in the conductive mesh layer, so that a moiré due to a regular overlap of the conductive mesh structure and a pixel structure of an image display device may be suppressed.

Therefore, enhancement of inherent optical transmittance of the conductive mesh structure and the suppression of the moiré by the pixel structure may both be implemented.

The conductive mesh structure may be applied to, e.g., an antenna element capable of performing a high-frequency or ultra-high-frequency (e.g., 3G, 4G, 5G or higher) mobile communication, such that the antenna element providing sufficient gain in the high-frequency or ultra-high frequency band and improved compatibility with the image display device may be implemented.

DETAILED DESCRIPTION OF THE EMBODIMENTS

According to embodiments of the present invention, a conductive mesh structure including a conductive mesh layer formed by intersecting conductive lines on a predetermined substrate layer is provided.

Further, according to embodiments of the present invention, a method of manufacturing an antenna element utilizing the conductive mesh structure is provided. However, the conductive mesh structure manufactured according to embodiments of the present invention is not applied only to the antenna element. The conductive mesh structure may be used in various electronic and electrical devices requiring high transparency and low resistance properties, such as a touch sensor, a fingerprint sensor, an optical filter, an electromagnetic wave filter, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
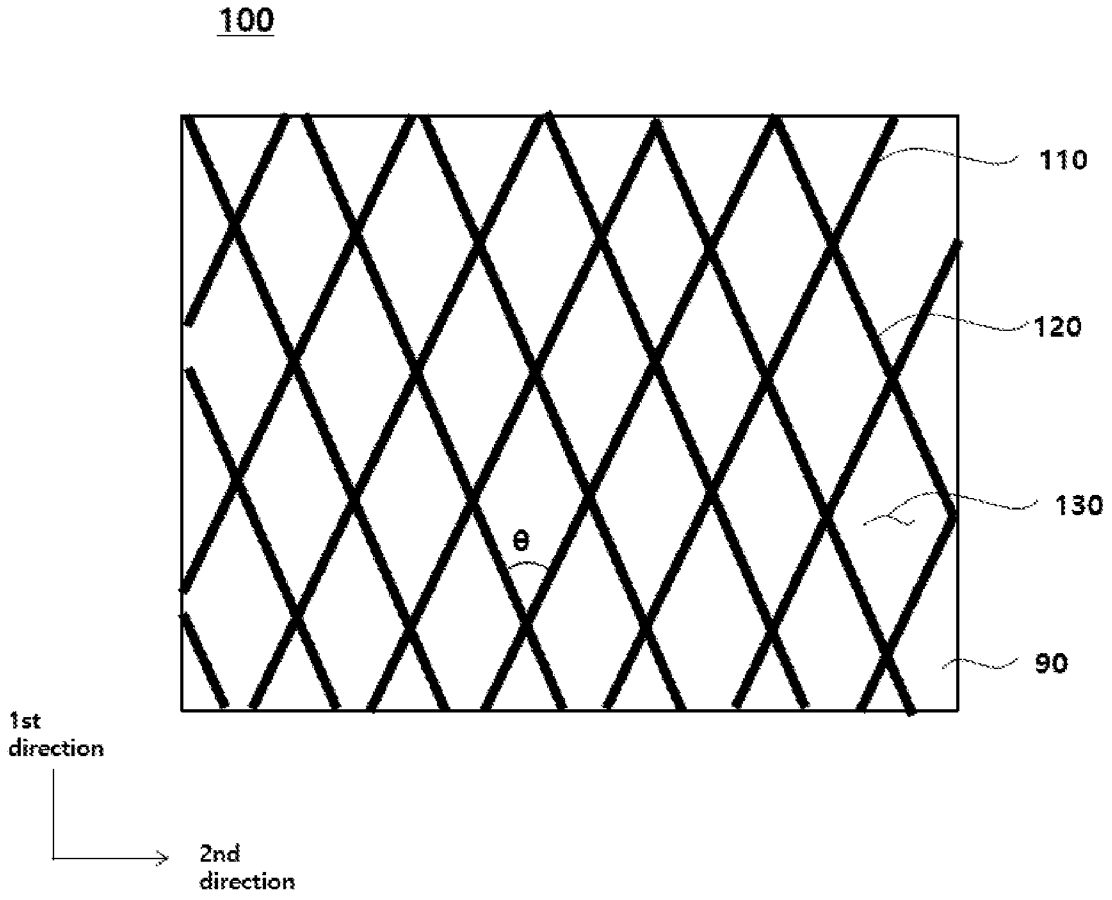
FIG. 1 is a schematic plan view illustrating a conductive mesh structure in accordance with exemplary embodiments.

FIG. 1 is a schematic plan view illustrating a conductive mesh structure in accordance with exemplary embodiments.

In FIG. 1, two directions being parallel to a top surface of a dielectric layer 90 and intersecting to be perpendicular to each other are defined as a first direction and a second direction. For example, the first direction may correspond to a length direction of the conductive mesh structure, and the second direction may correspond to a width direction of the conductive mesh structure.

Referring to FIG. 1, the conductive mesh structure 100 may include a conductive mesh layer formed on a dielectric layer 90. The conductive mesh layer may include conductive lines 110 and 120.

The dielectric layer 90 may include a transparent resin material. For example, the dielectric layer 90 may include a polyester-based resin such as polyethylene terephthalate, polyethylene isophthalate, polyethylene naphthalate and polybutylene terephthalate: a cellulose-based resin such as diacetyl cellulose and triacetyl cellulose: a polycarbonate-based resin: an acrylic resin such as polymethyl (meth) acrylate and polyethyl (meth)acrylate: a styrene-based resin such as polystyrene and an acrylonitrile-styrene copolymer: a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide: an imide-based resin; a polyethersulfone-based resin: a sulfone-based resin: a polyether ether ketone-based resin: a polyphenylene sulfide resin: a vinyl alcohol-based resin: a vinylidene chloride-based resin: a vinyl butyral-based resin; an allylate-based resin: a polyoxymethylene-based resin: an epoxy-based resin; a urethane or acrylic urethane-based resin; a silicone-based resin, etc. These may be used alone or in a combination of two or more therefrom.

In some embodiments, an adhesive film such as an optically clear adhesive (OCA), an optically clear resin (OCR), etc., may be included in the dielectric layer 90.

In some embodiments, the dielectric layer 90 may include an inorganic insulating material such as glass, silicon oxide, silicon nitride, silicon oxynitride, etc.

In some embodiments, a dielectric constant of the dielectric layer 100 may be adjusted in a range from about 1.5 to about 12. When the dielectric constant exceeds about 12, a signal loss may be excessively increased to degrade signal sensitivity and efficiency in a high frequency band communication.

The conductive lines 110 and 120 may include first conductive lines 110 and second conductive lines 120. As illustrated in FIG. 1, the first conductive lines 110 and the second conductive lines 120 may extend in oblique directions with respect to the first direction or the second direction.

For example, the first conductive lines 110 may extend to be inclined in a clockwise direction with respect to the first direction. The second conductive lines 120 may extend to be inclined in a counterclockwise direction with respect to the first direction.

In some embodiments, the first conductive lines 110 and the second conductive lines may be arranged symmetrically with respect to the first direction.

The first conductive lines 110 and the second conductive lines 120 may cross each other. Accordingly, a plurality of unit cells 130 may be defined by the intersecting and neighboring first conductive lines 110 and second conductive lines. The unit cell 130 may be defined as an open area of the conductive mesh layer.

As illustrated in FIG. 1, the unit cell 130 may have a rhombic shape, and a smaller interior angle among interior angles of the rhombus may be defined as an interior angle $\theta$ of the unit cell 130.

In some embodiments, the first conductive lines 110 may be inclined by an angle of $\theta/2$ in the clockwise direction with respect to the first direction. The second conductive lines may be inclined by an angle of $\theta/2$ in a counterclockwise direction with respect to the first direction.

Accordingly, the interior angle $\theta$ of the unit cell 130 may be defined by an intersection angle of the first conductive line 110 and the second conductive line 120. The conductive mesh layer may include an open area defined by repeating a plurality of the unit cells 130 and a conductive area defined by the conductive lines 110 and 120.

The conductive lines 110 and 120 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the conductive lines 110 and 120 may include silver (Ag) or a silver alloy (e.g., silver-palladium-copper (APC)), or copper (Cu) or a copper alloy (e.g., a copper-calcium (CuCa)) to provide a low resistance.

The conductive lines 110 and 120 may include a transparent conductive oxide such indium tin oxide (ITO), indium zinc oxide (IZO), indium zinc tin oxide (ITZO), zinc oxide (ZnOx), etc.

In some embodiments, the conductive lines 110 and 120 may include a multi-layered structure such as a double-layered structure of a transparent conductive oxide layer-metal layer, or a triple-layered structure of a transparent conductive oxide layer-metal layer-transparent conductive oxide layer. In this case, flexible property may be improved and the resistance may be lowered by the metal layer, and corrosive resistance and transparency may be improved by the transparent conductive oxide layer.

The conductive lines 110 and 120 may include a blackened portion, so that a reflectance at a surface of the conductive lines 110 and 120 may be decreased to suppress a visual recognition of patterns due to a light reflectance.

In an embodiment, a surface of the metal layer included in the conductive lines 110 and 120 may be converted into a metal oxide or a metal sulfide to form a blackened layer. In an embodiment, a blackened layer such as a black material coating layer or a plating layer may be formed on the conductive lines 110 and 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

Figure 2:
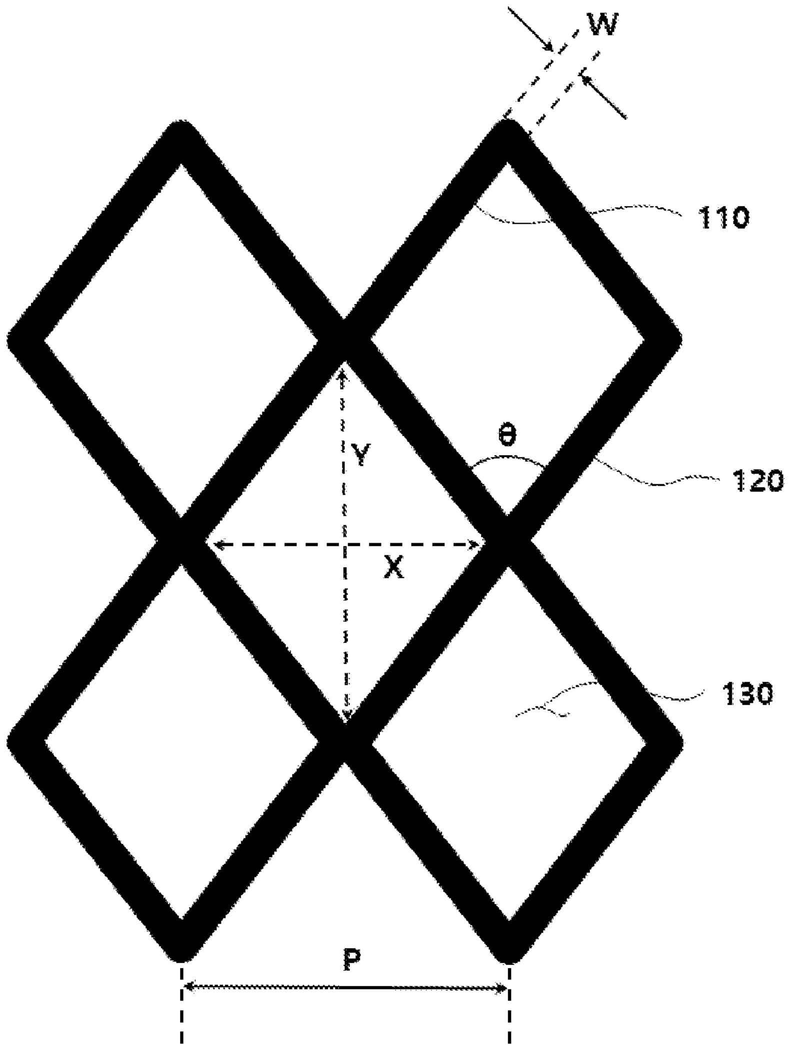
FIG. 2 is a partially enlarged plan view illustrating a construction of a conductive mesh layer in a conductive mesh structure in accordance with exemplary embodiments.

FIG. 2 is a partially enlarged plan view illustrating a construction of a conductive mesh layer in a conductive mesh structure in accordance with exemplary embodiments.

Referring to FIG. 2, as described with reference to FIG. 1, the conductive mesh layer may include the unit cells 130 defined by the intersecting first electrode lines 110 and second electrode lines 120, may include the open areas formed by internal spaces of the unit cells 130.

In exemplary embodiments, the conductive mesh structure including the conductive mesh layer may satisfy Equation 1 below.

$$18.5\% \leq (\text{a transmittance of the conductive mesh structure}) \times \tan(\theta/2) \leq 60\% \quad \text{[Equation 1]}$$

In Equation 1, 0 represents the interior angle of the unit cell 130 as described above.

In some embodiments, the conductive mesh structure including the conductive mesh layer may satisfy Equation 2 below.

$$18.5\% \leq (\text{a transmittance of the dielectric layer}) \times (\text{a ratio of the open area of the conductive mesh layer}) \times \tan(\theta/2) \leq 60\% \quad \text{[Equation 2]}$$

In Equation 2, the ratio of the open area of the conductive mesh layer may be a ratio of the open area relative to an area of the conductive mesh layer.

In an embodiment, the ratio of the open area of the conductive mesh layer may be defined by Equation 3 below.

$$(\text{the ratio of the open area of the conductive mesh layer}) = (XY)/\{(X+2W\times\text{COS}(\theta/2))(Y+2W\times\text{SIN}(\theta/2))\} \quad \text{[Equation 3]}$$

In Equation 3, X is a length of a diagonal line in a horizontal direction (the second direction) of the unit cell or the open area, and Y is a length of a diagonal line in a vertical direction (the first direction) of the unit cell or the open area. W is a line width of the conductive line, and θ represents the interior angle of the unit cell.

Within the above ranges of Equations 1 to 3, generation of a moiré due to, e.g., a regular overlap of a pattern structure of the conductive mesh layer and a pixel structure of an image display device may be reduced or suppressed while achieving desired transmittance of the conductive mesh structure.

For example, a value of tan (θ/2) reflecting the interior angle θ of the unit cell 130 may serve as a factor for suppressing the moiré. As shown in Equation 1, inherent optical properties of the conductive mesh structure may be obtained in consideration of the transmittance of the conductive mesh structure and tan (θ/2) together, and generation of the moiré due to interference with the pixel structure may also be reduced.

Additionally, as shown in Equations 2 and 3, the interior angle θ of the unit cell 130 may also serve as a factor that may change the transmittance of the conductive mesh structure. Accordingly, a design of the mesh structure that may suppress generation of the moiré may be implemented while satisfying the predetermined transmittance.

Further, the line width W of the conductive lines 110 and 120 may also be controlled as a variable for adjusting the transmittance of the conductive mesh structure. For example, an appropriate range of the line width W range may be set to ensure a sufficient current flow, an electric field generation, and an antenna gain, and the factors included in Equation 3 may be adjusted to satisfy the range indicated in Equation 1. Thus, improvement of electrical properties and optical transmittance and suppression of the moiré may be effectively implemented by adjusting the numerical range of Equation 1 according to exemplary embodiments.

In some embodiments, the (the transmittance of the conductive mesh structure)×tan (θ/2) value included in Equation 1 may be in a range from 20 to 55%, preferably from 20 to 40%, more preferably from 25 to 40%.

In some embodiments, the line width of the conductive lines 110 and 120 may be adjusted in a range from about 1 to about 5 μm.

In some embodiments, the conductive mesh layer may have a Moiré index of 0.6 or less defined by Equation 4 below.

$$\text{Moiré index} = (\text{contrast}) \times (\text{contrast sensitivity function (CSF) value}) \quad \text{[Equation 4]}$$

In Equation 4, the contrast represents a contrast difference represented by a brightness ratio of the brightest portion and the darkest portion of a microscope image of the conductive lines. For example, as an interval or pitch between the conductive lines increases, the contrast increases. Accordingly, probability of causing a user to recognize a moiré pattern may be increased.

The CSF value in Equation 1 may be obtained from a contrast sensitivity function (CSF). The CSF value may be a value obtained by quantifying a sensitivity as a regular pattern is repeated in a human visual system. According to the CSF value, ability or possibility of discrimination by a human eye may be quantified and provided according to a frequency of the pattern for an image having a small difference in contrast. As the CSF value increases, the probability of being recognized by the human eye by the regular overlap of the conductive lines 110 and 120 and the pixels may be increased.

Specifically, the CSF value may represent a visually recognizable probability by a human using a spatial frequency, a viewing angle and average luminance as variables. The spatial frequency may be expressed as a cycle (e.g., cycles per millimeter (CPM)) of bright and dark portions in an optical image or a reciprocal number of a pitch of the conductive lines 110 and 120. The spatial frequency may be converted into cycles per degree (CPD) to be used. In exemplary embodiments, the spatial frequency may be measured by fixing a distance between the conductive lines 110 and 120 and a viewer's eye as 400 mm.

The CSF value may be calculated through functions of Equation 5, Equation 5-1 and 5-2 below.

$$CSF(L,f)=a(L,f)fe^{-b(L)f}\left(1+0.06e^{b(L)f}\right)^{0.5} \quad \text{[Equation 5]}$$

$$a(L,f)=\frac{\left[540\left(1+0.7/L\right)^{0.2}\right]}{\left[1+12\left(1+f/3\right)^{-2}/w\right]} \quad \text{[Equation 5-1]}$$

$$b(L)=0.3\left(1+100/L\right)^{0.15} \quad \text{[Equation 5-2]}$$

In Equations 5, 5-1 and 5-2, L is the average luminance (unit: nt=cd/$m^2$), w is the viewing angle (degree), and f is the spatial frequency (cycle per degree).

As described above, the internal angle (θ) of the unit cell may be used as a moiré control factor, and the transmittance may be also controlled using the internal angle θ, so that the inherent optical properties of the conductive mesh structure 100 may be controlled within a desired range while suppressing the moiré.

Figure 3:
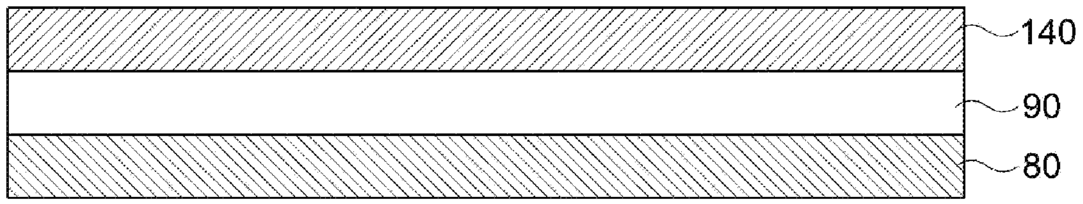
FIGS. 3 and 4 are a schematic cross-sectional view and a schematic plan view, respectively, illustrating an antenna element in accordance with exemplary embodiments.
Figure 4:
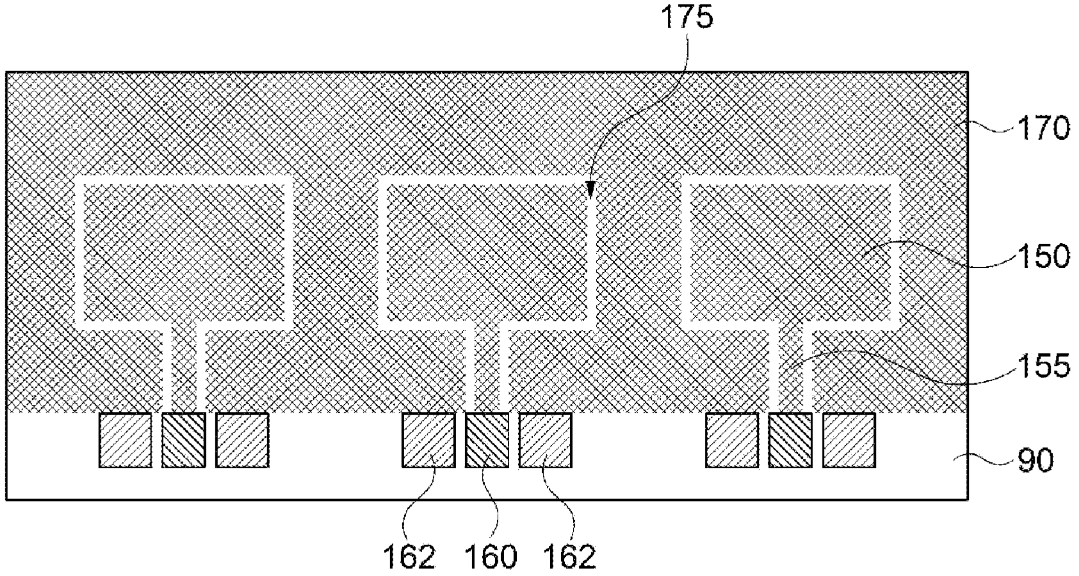

FIGS. 3 and 4 are a schematic cross-sectional view and a schematic plan view, respectively, illustrating an antenna element in accordance with exemplary embodiments.

Referring to FIGS. 3 and 4, the antenna element may include an antenna unit layer 140 formed on a top surface of a dielectric layer 90.

The antenna unit layer 140 may include the above-described conductive mesh structure. In exemplary embodiments, the antenna unit layer 140 may include a radiator 150 and a transmission line 155 extending from one side or one end of the radiator 150.

The radiator 150 and the transmission line 155 may include the conductive mesh structure or the conductive mesh layer in which parameters related to transmittance and the interior angle of the unit cell may be adjusted according to Equations 1 to 3.

In some embodiments, the antenna unit layer 140 may further include a dummy mesh pattern 170 formed around the radiator 150. The dummy mesh pattern 170 may also include the above-described conductive mesh structure.

The dummy mesh pattern 170 may be distinguished from the radiator 150 and the transmission line 155 by a separation region 175. In some embodiments, the separation region 175 may be formed together with the first and second conductive lines 110 and 120.

For example, a conductive layer may be formed on the dielectric layer 90. While forming the first and second conductive lines 110 and 120 by etching the conductive layer according to a design that satisfies the parameters related to the transmittance and the internal angle of the unit cell according to Equations 1 to 3, the separation region 175 may also be formed by the etching process.

The dummy mesh pattern 170 may also be formed around the transmission line 155. In some embodiments, a plurality of antenna units each including the radiator 150 and the transmission line 155 may be formed on the dielectric layer 90, and the dummy mesh pattern 170 may be formed around the plurality of antenna units, or may be formed between the plurality of antenna units.

The dummy mesh pattern 170 may include the conductive mesh layer and may be disposed around the antenna unit, a distribution of the conductive patterns of the antenna element may be averaged. Accordingly, the conductive lines 110 and 120 or the conductive pattern may be prevented from being recognized by the user.

The antenna unit layer 140 may include a signal pad 160 connected to one end portion of the transmission line 155. The signal pad 160 may be electrically connected to an antenna driving integrated circuit (IC) chip through, e.g., a flexible printed circuit board (FPCB). Accordingly, feeding and driving signals may be applied to the radiator 150 through the signal pad 160 by the antenna driving IC chip.

In some embodiments, a ground pad 162 may be disposed around the signal pad 160. For example, a pair of the ground pads 162 may be disposed to be electrically and physically separated from the transmission line 155 and the signal pad 160 with the signal pad 160 interposed therebetween.

Noises around the signal pad 160 may be absorbed or shielded by the ground pad 162, and a bonding process of the FPCB to the antenna element may be performed more easily.

The signal pad 160 and the ground pad 162 may be formed in a solid pattern including the metal or alloy as described above. In some embodiments, the signal pad 160 and the ground pad 162 may be disposed not to overlap the pixel structure.

The antenna element may further include a ground layer 80 disposed on a bottom surface of the dielectric layer 90. A generation of an electric field in the radiator 150 and the transmission line 155 may be more promoted by the ground layer 80, and electrical noises around the radiator 150 and the transmission line 155 may be absorbed or shielded.

In some embodiments, the ground layer 80 may be included as a separate component of the antenna element. In some embodiments, a conductive member of a display device on which the antenna element is included may serve as a ground layer.

The conductive member may include, e.g., various wires such as a gate electrode, a scan line or a data line of a thin film transistor (TFT) included in a display panel, or various electrodes such as a pixel electrode and a common electrode.

For example, in an embodiment, various structures including a conductive material disposed under the display panel may serve as the ground layer 80. For example, a metallic plate (e.g., a stainless steel plate such as a SUS plate), a pressure sensor, a fingerprint sensor, an electromagnetic wave shielding layer, a heat dissipation sheet, a digitizer, etc., may serve as the ground layer 80.

In exemplary embodiments, the antenna element may provide a sufficient amount of gain in the high frequency or ultra-high frequency band. In some embodiments, the antenna element may provide an antenna gain of 0 dBi or more in a frequency band of 20 GHz or more.

Hereinafter, preferred embodiments are presented to aid understanding of the present invention, but these embodiments are only illustrative of the present invention and do not limit the scope of the appended claims, and various changes and modifications to embodiments within the scope and spirit of the present invention are obvious and possible to those skilled in the art. It is to be understood that these variations and modifications fall within the scope of the appended claims.

EXPERIMENTAL EXAMPLE

(1) Examples and Comparative Examples

A conductive mesh structure was obtained by forming a conductive mesh layer by forming first conductive lines and second conductive lines (see FIG. 1) containing CuCa on a COP dielectric layer having a transmittance of 91.1% under conditions described in Table 1.

Values calculated according to Equations 1 to 3 were obtained using the transmittance of the conductive mesh structure and an interior angle of the unit cell measured from each of the conductive mesh structures of Examples and Comparative Examples. Specifically, the transmittance of the conductive mesh structure was measured by measuring luminous transmittance (Y_D65) with a spectrophotometer (CM-3600A, Konica Minolta) under 2D observer conditions.

TABLE 1

| | line width (μm) | θ | tan(θ/2) (1) | transmittance of conductive mesh structure (2) (%) | (1) × (2) (%) |
|---|---|---|---|---|---|
| Example 1 | 2 | 24 | 0.21 | 88.3 | 19 |
| Example 2 | 1.9 | 30 | 0.27 | 88.4 | 24 |
| Example 3 | 1.8 | 36 | 0.32 | 88.8 | 28 |
| Example 4 | 2.2 | 42 | 0.38 | 88.0 | 33 |
| Example 5 | 1.7 | 48 | 0.45 | 89.0 | 40 |
| Example 6 | 1.7 | 54 | 0.51 | 88.7 | 45 |
| Example 7 | 2.5 | 56 | 0.53 | 87.9 | 47 |
| Example 8 | 2 | 58 | 0.55 | 88.4 | 49 |
| Example 9 | 1.8 | 60 | 0.58 | 88.6 | 51 |
| Example 10 | 2.7 | 62 | 0.60 | 87.7 | 53 |
| Example 11 | 1.7 | 64 | 0.62 | 90.7 | 56 |
| Example 12 | 2.3 | 66 | 0.65 | 87.8 | 57 |
| Comparative Example 1 | 2.9 | 72 | 0.73 | 87.7 | 64 |
| Comparative Example 2 | 2.5 | 74 | 0.75 | 87.6 | 66 |
| Comparative Example 3 | 1.9 | 76 | 0.78 | 88.4 | 69 |
| Comparative Example 4 | 2.7 | 78 | 0.81 | 87.3 | 71 |
| Comparative Example 5 | 2.4 | 84 | 0.90 | 87.5 | 79 |
| Comparative Example 6 | 2.6 | 90 | 1.00 | 87.6 | 88 |
| Comparative Example 7 | 1.8 | 90 | 1.00 | 90.6 | 91 |
| Comparative Example 8 | 2.4 | 24 | 0.21 | 87.0 | 18 |
| Comparative Example 9 | 2.5 | 90 | 1.00 | 87.0 | 87 |

(1) Experimental Example

1) Moiré Evaluation

Each of the conductive mesh structures of Examples and Comparative Examples was superimposed on a display panel including pixel structures obtained from currently commercially available smart phones, and 10 people observed whether a moiré phenomenon occurred or not.

Product A (Mate 30 Pro: Huawei), Product B (I-Phone X: Apple), Product C (Galaxy S10 5G: Samsung Electronics) and Product D (Galaxy Note 8: Samsung Electronics) were used as the smart phones, and moiré phenomenon due to the conductive mesh structure was observed for each of the four products.

Specifically, 10 panelists visually observed, and a recognition probability was evaluated through the number of panelists who evaluated a moiré pattern was clearly recognized. The evaluation criteria are as follows (for example, if 7 out of 10 people evaluate that the moiré pattern is recognized, the probability of recognition is 70%)

<Moiré Evaluation Criteria>

○: 20% or less of moiré recognition probability

Δ: 20 to 50% of moiré recognition probability

X: 60% or more of Probability of moiré recognition

2) Antenna Gain Evaluation

A single radiator having a size of 2.8 mm×2.8 mm was formed using each conductive mesh structure of Examples and Comparative Examples, and an antenna gain (dBi) through the radiator was measured using a mmWave measuring device (C&G Microwave Co.) under 28 GHz conditions.

The evaluation results are as described in Table 2 below.

TABLE 2

| | Moiré evaluation | | | | Antenna |
|---|---|---|---|---|---|
| | Product A | Product B | Product C | Product D | gain (dBi) |
| Example 1 | Δ | Δ | Δ | Δ | 0.6 |
| Example 2 | Δ | Δ | Δ | ○ | 0.5 |
| Example 3 | Δ | ○ | ○ | Δ | 0.3 |
| Example 4 | Δ | ○ | ○ | Δ | 0.1 |
| Example 5 | Δ | ○ | ○ | Δ | 0 |
| Example 6 | ○ | Δ | Δ | Δ | 0.2 |
| Example 7 | ○ | Δ | Δ | Δ | 0.8 |
| Example 8 | ○ | Δ | Δ | Δ | 0.3 |
| Example 9 | ○ | Δ | Δ | Δ | 0.2 |
| Example 10 | ○ | Δ | Δ | Δ | 0.9 |
| Example 11 | Δ | Δ | Δ | Δ | 0.1 |
| Example 12 | Δ | Δ | Δ | Δ | 0.6 |
| Comparative Example 1 | X | X | X | X | 0.9 |
| Comparative Example 2 | X | X | X | X | 1 |
| Comparative Example 3 | X | X | X | X | 0.3 |
| Comparative Example 4 | X | X | X | X | 1.1 |
| Comparative Example 5 | X | X | X | X | 1.0 |
| Comparative Example 6 | | X | X | X | 1.0 |
| Comparative Example 7 | X | X | X | X | −0.1 |
| Comparative Example 8 | X | X | X | X | 1.2 |
| Comparative Example 9 | X | X | X | X | 1.2 |

Referring to Table 1, in Examples satisfying the numerical ranges described in Equations 1 to 3 above, the gain value greater than or equal to a predetermined target gain (e.g., 0 dBi) for an antenna radiation implementation was obtained while suppressing the moiré phenomenon.

For example, when the numerical range of Equation 1 was in a range from about 20 to 55, the probability of moiré recognition was reduced to 20% or less on the pixel structure of at least one product.

What is claimed is:

1. An antenna element comprising:

a conductive mesh structure comprising:

a dielectric layer; and a conductive mesh layer disposed on the dielectric layer, the conductive mesh layer comprising first conductive lines and second conductive lines crossing each other, wherein the conductive mesh layer comprises unit cells defined by the neighboring first conductive lines and the neighboring second conductive lines which cross each other, and the conductive mesh structure that satisfies Equation 1 and Equation 2 below:

$$20\% \leq (\text{a transmittance of the conductive mesh structure}) \times \tan(\theta/2) \leq 45\% \quad \text{[Equation 1]}$$

$$20\% \leq (\text{a transmittance of the dielectric layer}) \times (\text{a ratio of an open area of the conductive mesh layer}) \times \tan(\theta/2) \leq 45\% \quad \text{[Equation 2]}$$

wherein θ in Equation 1 is an interior angle of the unit cell, in Equation 1 and Equation 2, θ is an intersecting angle of the first conductive lines and the second conductive lines, wherein the ratio of an open area of the conductive mesh layer is defined as a ratio of an area of the unit cells relative to a total area of the first conductive lines, the second conductive lines and the unit cells, wherein the antenna element comprises:

a radiator formed from the conductive mesh layer;

a transmission line formed from the conductive mesh layer and connected to the radiator; and a signal pad directly connected to an end portion of the transmission line and formed as a solid pattern, wherein the radiator, the transmission line and the signal pad are directly formed on a top surface of the dielectric layer.

2. The antenna element according to claim 1, wherein the ratio of the open area of the conductive mesh layer is defined by Equation 3 below:

$$\text{(the ratio of the open area of the conductive mesh layer)} = (X \times Y)/[\{X+(2W \times \mathrm{COS}(\theta/2))\} \times \{Y+(2W \times \mathrm{SIN}(\theta/2))\}] \quad \text{[Equation 3]}$$

in Equation 3, X is a length of a diagonal line of each of the unit cells having a rhombus shape in a horizontal direction, Y is a length of a diagonal line of each of the unit cells having the rhombus shape in a vertical direction, and W is a line width of the first conductive lines and the second conductive lines.

3. The antenna element according to claim 1, further comprising a dummy mesh pattern formed from the conductive mesh layer and physically and electrically separated from the radiator.

4. The antenna element according to claim 1, wherein the antenna element has a gain of 0 dBi or more at a frequency of 20 GHz or more.

* * * * *